(12) United States Patent
Saieg et al.

(10) Patent No.: US 7,802,803 B2
(45) Date of Patent: Sep. 28, 2010

(54) TRAILER SLIDER LOCKING SYSTEM

(75) Inventors: Steven G. Saieg, Rochester Hills, MI (US); Vern A. Caron, Kalamazoo, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 477 days.

(21) Appl. No.: 11/248,038

(22) Filed: Oct. 12, 2005

(65) Prior Publication Data

US 2006/0267307 A1 Nov. 30, 2006

Related U.S. Application Data

(63) Continuation-in-part of application No. 11/141,628, filed on May 31, 2005.

(51) Int. Cl.
*B62D 53/06* (2006.01)
(52) U.S. Cl. .................. 280/149.2; 280/407.1
(58) Field of Classification Search ............. 280/149.2, 280/407.1; 267/170, 179; 292/10, 127
See application file for complete search history.

(56) References Cited

U.S. PATENT DOCUMENTS

| | | | | | |
|---|---|---|---|---|---|
| 2,935,332 | A | * | 5/1960 | De Lay | 280/81.1 |
| 3,087,741 | A | * | 4/1963 | De Lay | 280/81.1 |
| 3,379,453 | A | * | 4/1968 | Fujioka | 280/81.1 |
| 3,618,969 | A | * | 11/1971 | Glassmeyer | 280/149.2 |
| 3,778,079 | A | * | 12/1973 | Vornberger et al. | 280/149.2 |
| 4,777,810 | A | | 10/1988 | Webster | |
| 4,838,566 | A | * | 6/1989 | Baxter et al. | 280/149.2 |
| 4,838,578 | A | * | 6/1989 | Baxter | 280/149.2 |
| 4,955,629 | A | | 9/1990 | Todd et al. | |
| 5,026,101 | A | * | 6/1991 | Dotterweich et al. | 292/166 |
| 5,346,233 | A | * | 9/1994 | Moser | 280/149.2 |
| 5,460,237 | A | * | 10/1995 | Schueman | 180/209 |
| 5,462,301 | A | * | 10/1995 | Schueman | 280/149.2 |
| 5,474,149 | A | * | 12/1995 | Schueman | 180/209 |
| 5,480,171 | A | * | 1/1996 | Cheffey | 280/149.2 |
| 5,507,511 | A | * | 4/1996 | Schueman | 280/149.2 |
| 5,564,727 | A | * | 10/1996 | Wessels | 280/407.1 |
| 5,620,195 | A | * | 4/1997 | Wessels | 280/149.2 |
| 5,642,896 | A | * | 7/1997 | Pierce et al. | 280/149.2 |

(Continued)

FOREIGN PATENT DOCUMENTS

WO WO 00/43255 7/2000

OTHER PUBLICATIONS

Brochure for Hendrickson International Corporation, found at: http://www.Hendrickson-intl.com.

*Primary Examiner*—Paul N Dickson
*Assistant Examiner*—Timothy D Wilhelm
(74) *Attorney, Agent, or Firm*—Carlson, Gaskey & Olds

(57) ABSTRACT

A trailer slider locking system includes body rails longitudinally slidable relative to a suspension frame side rail. The body rails have holes providing multiple suspension positions. A pin locking system includes a pin moveable between retracted and locked positions. An end of the pin is received in one of the holes in the locked position. The pin has a first centerline and the holes have a second centerline. The end of the pin extends through the hole with the centerlines being offset from one another in the locked position. The pin has a tapered end so that the pin will extend through the body rail hole prior to advancing to the fully locked position.

19 Claims, 8 Drawing Sheets

U.S. PATENT DOCUMENTS

| | | | | |
|---|---|---|---|---|
| 5,758,890 A * | 6/1998 | Wessels | | 280/149.2 |
| 5,813,682 A * | 9/1998 | Stevens | | 280/149.2 |
| 6,122,946 A * | 9/2000 | Blanch | | 70/473 |
| 6,435,536 B2 * | 8/2002 | Eckelberry | | 280/407.1 |
| 6,471,227 B2 | 10/2002 | Eckelberry et al. | | |
| 6,485,054 B1 * | 11/2002 | Yurgevich | | 280/789 |
| 6,488,303 B1 | 12/2002 | Cobb | | |
| 6,641,157 B2 | 11/2003 | Eckelberry et al. | | |
| 6,921,100 B2 * | 7/2005 | Mantini et al. | | 280/407 |
| 7,163,220 B2 * | 1/2007 | Pappas | | 280/149.2 |
| 7,188,684 B2 | 3/2007 | Nolan | | |

\* cited by examiner

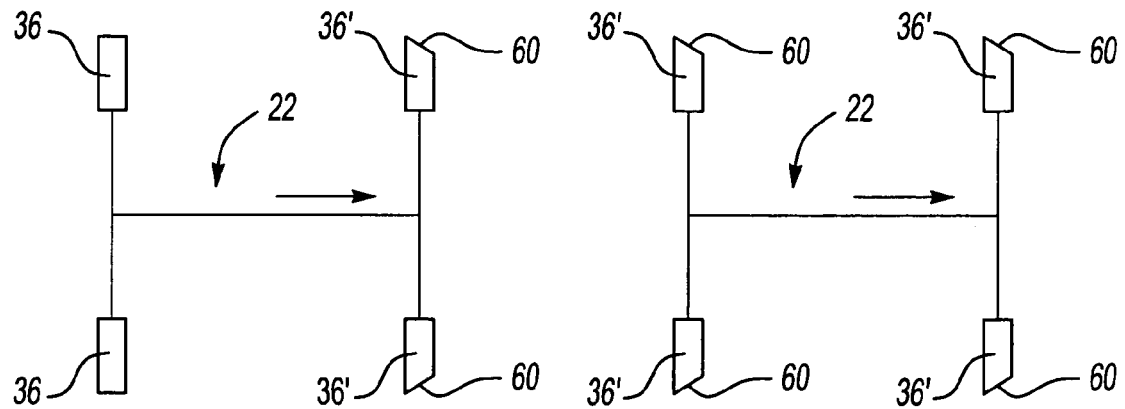
*Fig-6A*  *Fig-6B*
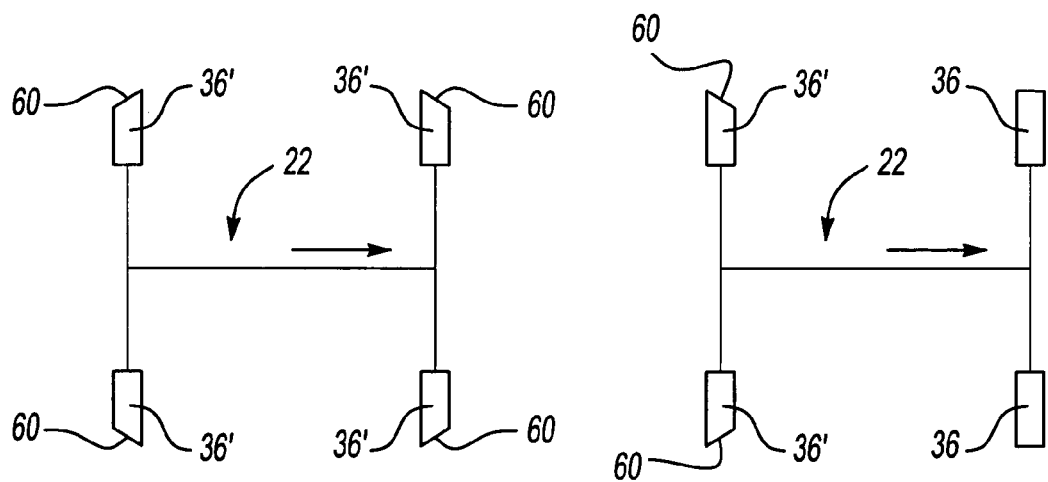
*Fig-6C*  *Fig-6D*

US 7,802,803 B2

TRAILER SLIDER LOCKING SYSTEM

RELATED APPLICATIONS

This application is a continuation-in-part of co-pending U.S. patent application Ser. No. 11/141,628, filed on May 31, 2005.

BACKGROUND OF THE INVENTION

The present invention relates to a trailer slider locking system, and more particularly, the invention relates to a pin configuration that better ensures pin engagement with the body rails.

Trailer slider locking systems are utilized on tractor trailers to adjust the longitudinal position of a slider carrying the trailer suspension beneath the trailer body. Trailer body rails are supported on top of and slide relative to suspension frame side rails. The trailer body rails include a series of holes providing multiple body positions relative to the trailer suspension. A mechanical linkage supported on a slider, or trailer suspension frame is used to bias spring-loaded pins to a locked position in which the pins are received in holes in the trailer body rails. The pins lock the side and body rails together. The pins are moved to a retracted position using the mechanical linkage to longitudinally adjust the position of the trailer body rail relative to the trailer suspension frame.

Trailer locking systems often have a problem in which the pins do not engage the body rails or fully extend through the holes in the body rails. If the pins are not fully locked, the trailer body may sometimes slide relative to the trailer suspension frame during vehicle operation, possibly resulting in a damaging collision between the trailer body and suspension frame. For example, if hard braking occurs when the pins are not fully locked, prior art pins will jump past body rail holes as the trailer body rails move forward relative to the trailer suspension frame, which is being slowed or stopped due to braking. Therefore, what is needed is a trailer sliding locking system that enables better pin engagement in the locked position.

SUMMARY OF THE INVENTION AND ADVANTAGES

The inventive trailer slider locking system includes a pair of body rails longitudinally slidable relative to suspension frame side rails. The body rails have holes providing multiple suspension positions. A pin locking system includes a pin moveable between retracted and locked positions. An end of the pin extends through one of the holes in the locked position. The system typically includes at least one pin on each side. The pin has a first centerline and the holes have a second centerline. The end of the pin extends through the hole with the centerlines offset from one another in the locked position.

In one example of the invention, first and second holes along the body rail provide a distance that is greater than a distance provided by first and second locking pin centerlines. In another example, the distance between the first and second holes is less than the distance between the first and second locking pin centerlines. For example, the pins are smaller than the holes so that there is a greater longitudinal length along which the pins can be received in the body rail holes.

The pins define an axis extending along the length of the pin. At least a portion of the pin extends outboard of a suspension side rail when the pins are fully extended. This portion of the pin, when viewed from above, is non-symmetrical about the axis of the pin. This pin configuration allows a portion of the pin to extend through the body rail hole prior to the full diameter of the pin advancing to the fully extended and locked position. This prevents relative movement between the trailer body and suspension frame even if the pin is not fully extended.

Another feature of the invention includes an aperture in the pin on the opposite side of the pin end received in the body rail hole. The aperture permits an end of the linkage to be received within the aperture in the event that the pin cannot be advanced from the retracted position to the locked position. In this manner, if one of the pins cannot move to the fully locked position for some reason, it will not prevent the other pins from moving to the locked position by inhibiting the movement of the mechanical linkage that actuates the pins.

Accordingly, the present invention provides a trailer sliding locking system that enables better pin engagement in the locked position.

BRIEF DESCRIPTION OF THE DRAWINGS

Other advantages of the present invention can be understood by reference to the following detailed description when considered in connection with the accompanying drawings wherein:

FIG. 6A is a schematic view of one inventive pin configuration.

FIG. 6B is a schematic view of another inventive pin configuration.

FIG. 6C is a schematic view of another inventive pin configuration.

FIG. 6D is a schematic view of another inventive pin configuration.

DETAILED DESCRIPTION OF THE PREFERRED EMBODIMENT

Figure 1:
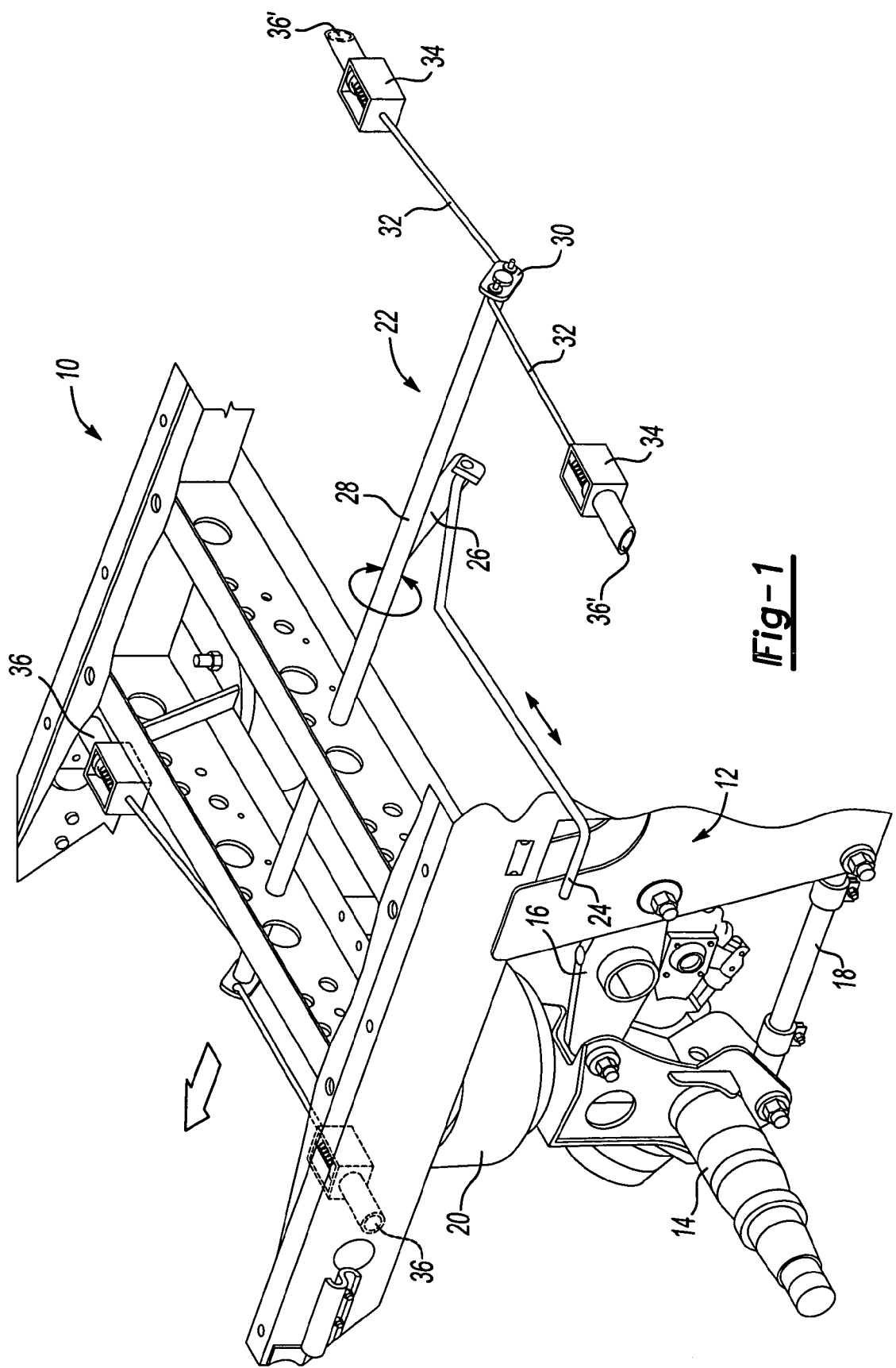
FIG. 1 is a perspective view of the inventive trailer slider locking system.

FIG. 1 depicts a trailer slider system 10 including a suspension frame 12 supporting an axle 14. The axle 14 is supported for articulation on the suspension frame 12 by upper 16 and lower 18 arms. An air bag 20 is arranged between the axle 14 and suspension frame 12. The suspension configuration shown in FIG. 1 is only exemplary, and one of ordinary skill in the art will understand that the inventive trailer slider system can be used with any suspension configuration.

A pin locking system 22 is supported on the suspension frame 12. The pin locking system 22 includes a handle 24 that is moved laterally by a vehicle operator to actuate the system between retracted and locked positions. While a manual system is shown, it should be understood that an automated or semi-automated system may also be used. The handle 24 is connected to a crank 26 secured to shaft 28 that is rotationally supported by the suspension frame 12. The shaft 28 includes a pair of cam mechanisms 30 each of which pivotally support ends of linkages 32. Cages 34 are secured to the suspension frame 12 and house pins 36 that are actuated by the linkages 32 between retracted and locked positions in response to manipulation of the handle 24. While the arrangement of four pins 36 as shown is typical, fewer or more pins may also be used.

Figure 2A:
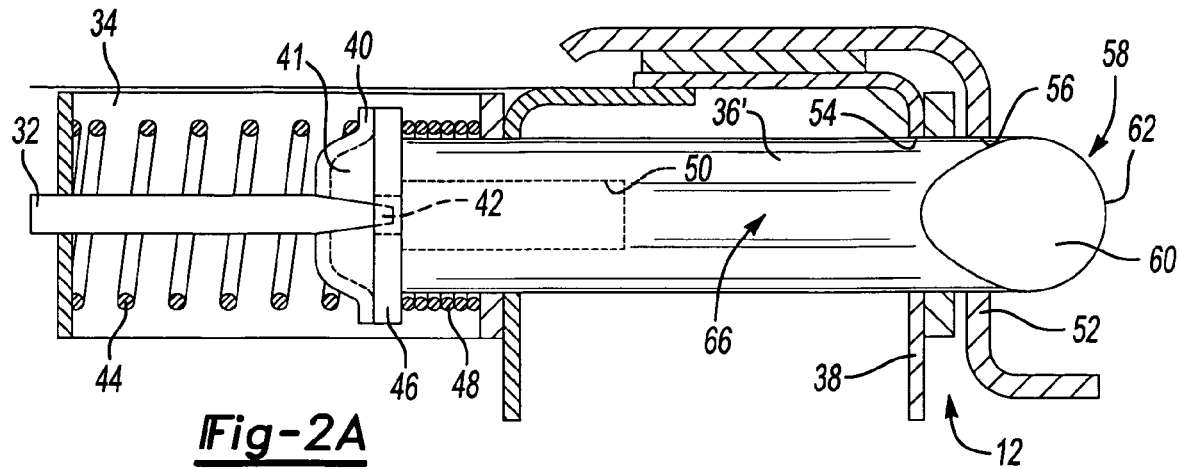
FIG. 2A is a cross-sectional view in a locked position.
Figure 2B:
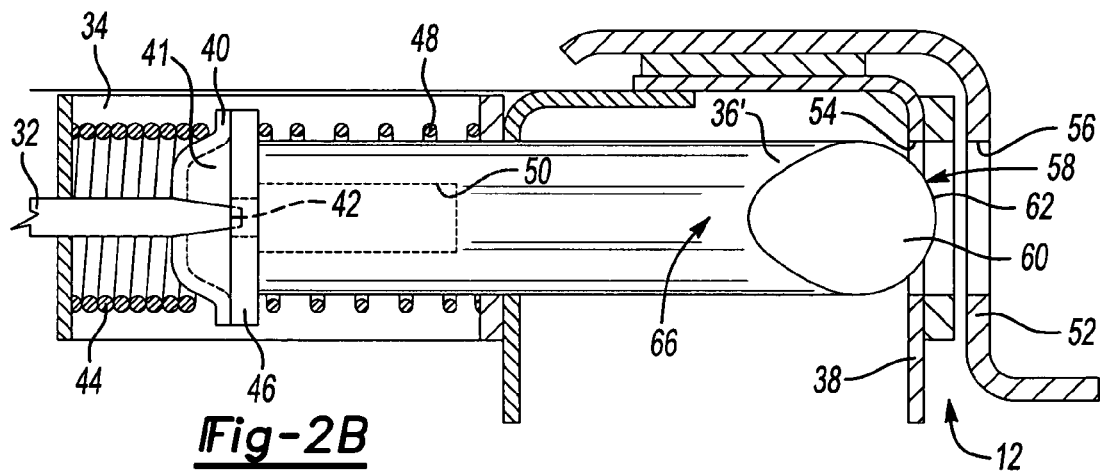
FIG. 2B is a cross-sectional view in a retracted position.

Referring to FIG. 2A, an inventive pin 36' is shown supported by a side rail 38 of the suspension frame 12. The cage 34 is supported on the side rail 38. An end 42 of the linkage 32 extends into the cage 34 for manipulating the inventive pin 36' between locked (FIG. 2A) and retracted (FIG. 2B) positions. An end cap 40 is secured to the end 42 and engages a flange 46 of the pin 36'. A first spring 44 biases the pin 36' to the locked position. The spring 44 is arranged between a rearward portion of the cage 34 and the end cap 40. A second spring 48, which generates a biasing force less than the first spring 44, is arranged between the flange 46 and a forward portion of the cage 34 for biasing the pin 36' to the retracted position. The handle 24 is pulled outward to move the pins 36' from the locked position to the retracted position. The linkages 34 compress the first spring 44 by pulling it towards the rearward portion of the cage 34 with the end cap 40. Removing the biasing force of the first spring 44 from the flange 46 enables the second spring 48 to urge the pin 36' from the locked position (FIG. 2A) to the retracted position (FIG. 2B).

In one embodiment, the linkages 32 do not move the pin 36' from the retracted position to the locked position. Instead, the linkages 32 are only used to manipulate the pin 36' to the retracted position. Accordingly, a chain or cable may be used as a linkage 32.

Figure 2C:
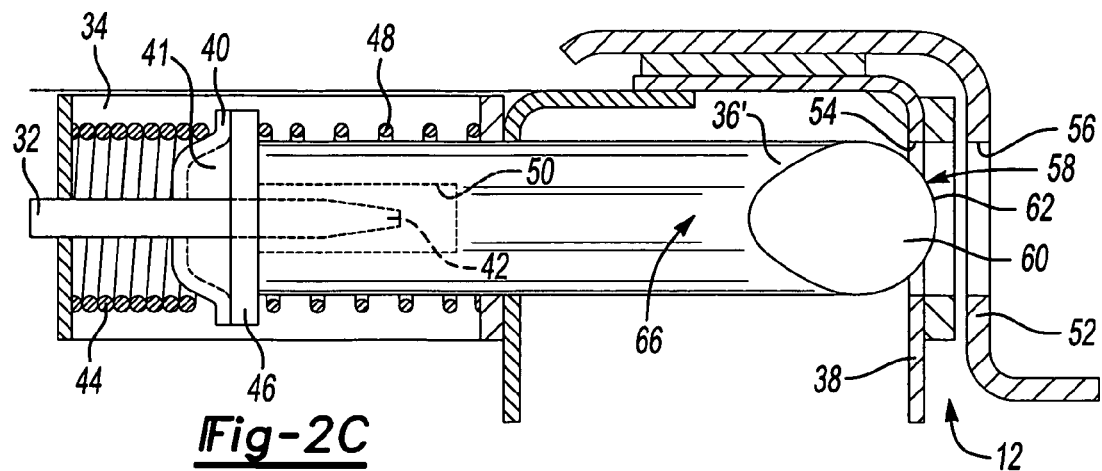
FIG. 2C is a cross-sectional view in a bound position.

Occasionally the pin 36' will bind in holes 54 in the side rails 38 or holes 56 in the body rails 52 when the handle 24 is pushed to return the pins 36' from the retracted position (FIG. 2B) to the locked position (FIG. 2A). In prior art arrangements, a binding pin or the pin being blocked by the body rails could prevent the other pins from being biased to the locked position by the first springs 44 because the end 42 of the linkage 32 associated with the bound pin 36' would collide with the rear of the pin 36'. This might prevent the other linkages 32 from moving toward the forward portions of the cages 34, which enables the first springs 44 to advance. To address this problem, one aspect of the present invention incorporates apertures 50 in the rear of the pins 36' to accommodate the end 42 of the linkage 32 if the pin 36' should bind, as shown in FIG. 2C. The end 42 extends into the aperture 50 permitting the other linkages to move toward the forward portion of the cage 34 permitting the first springs 44 to expand and bias the pins 36' to the locked positions.

In another feature of this invention, the inventive pins 36' include tapered ends 58 having tapered surfaces 60 that enable the pin end to extend through the body holes 56 even if the pins 36' do not fully align with the body holes 56. That is, the centerline of the pins 36' and body holes 56 can be offset by a substantial amount and yet the pins 36' will extend through the body holes 56 thereby preventing the body rails 52 from moving relative to the side rails 38 even if the pins 36' and body rail holes 56 are misaligned. Prior art systems have required relatively precise alignment between the centerlines of the pins and body rail holes, which has resulted in the pins not always fully engaging the body rails. This result may permit the body rails to move relative to the slider under braking conditions.

Figure 3A:
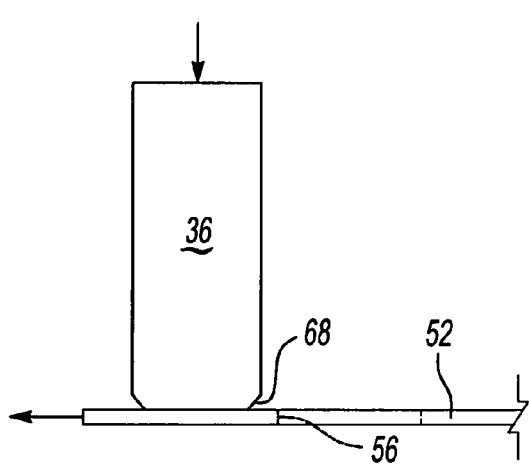
FIG. 3A is a schematic view of the prior art in a transient trailer body position.
Figure 3B:
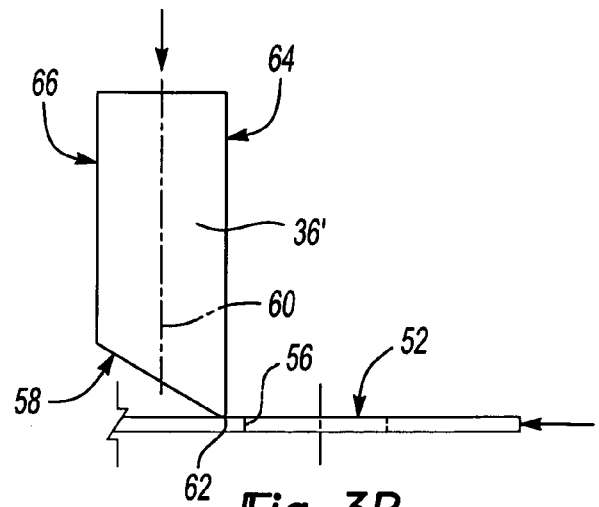
FIG. 3B is a schematic view of the inventive pin in a transient trailer body position.
Figure 4A:
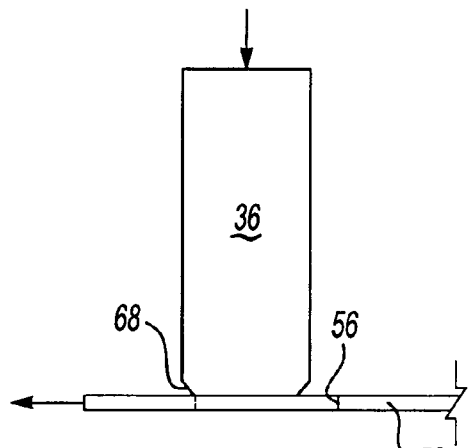
FIG. 4A is a schematic view of the prior art in the transient embodiment position with the pins partially aligned with the body rail holes.
Figure 4B:
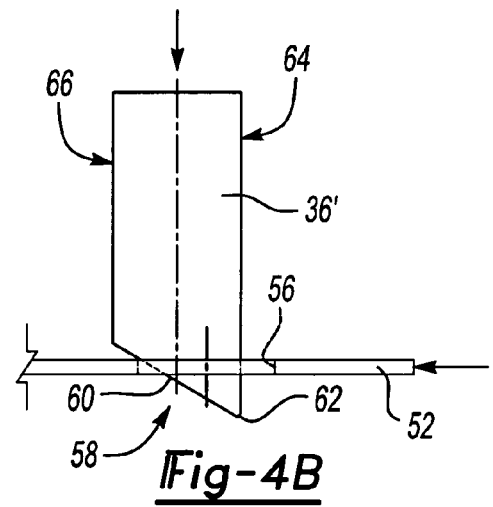
FIG. 4B is a schematic view of the inventive pin in the transient embodiment position with the pins partially aligned with the body rail holes.
Figure 5A:
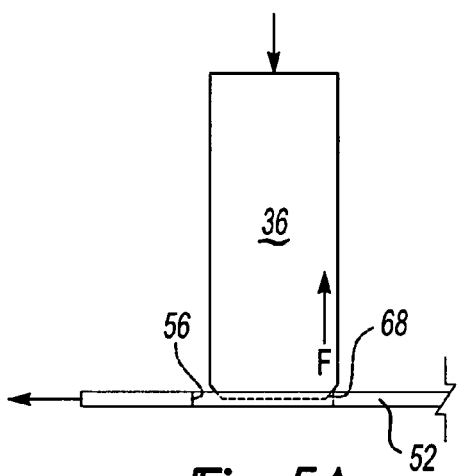
FIG. 5A is a schematic view of the prior art with the trailer body in an aligned pin position with the centerline of the pin partially offset from the centerline of the trailer body hole.
Figure 5B:
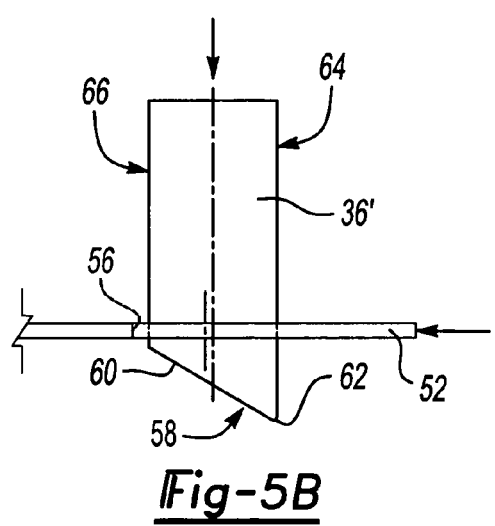
FIG. 5B is a schematic view of the inventive pin with the trailer body in an aligned pin position with the centerline of the pin partially offset from the centerline of the trailer body hole.

Referring to FIGS. 3B, 4B and 5B, the tapered end 58 includes an apex 62 at a terminal end of the pin 36'. In the example shown in the Figures, the pin 36' includes a periphery, which in one example is a cylindrical surface, having opposing sides 64, 66. The periphery is spaced axially from the apex 62 in the example shown, a tapered surface 60 extends from the apex 62, which lies along long side 64, to a short side 66 opposite the long side 64. In the example shown, the tapered surface 60 is a generally planar surface and the apex 62 is offset from the centerline. The tapered surface 60 enables the pin 36' to extend through the hole 56 in the body rail 52 prior to a centerline of the pin 36' and a centerline of the body hole 56 being substantially aligned. Thus, the body rail 52 is prevented from moving relative to the side rails 38 when the pins 36' are misaligned with the body holes 56. The flat provided by the tapered surface 60 prevents the pin 36' from rotating.

FIG. 3A depicts a prior art pin in a transient position, and FIG. 3B depicts the inventive pin 36' in the same transient position. As the position of the body rail 52 is adjusted by the vehicle operator, the pin 36' has not extended through the body rail hole 56, as shown in FIG. 4A with the prior art system. As shown with the inventive pin in FIG. 4B, the long side 64 of the pin 36' extends into the body hole 56. The long side 64 provides a surface that is normal to the body rail 52 so that forward movement of the body rail 52 will be prevented.

FIG. 5A depicts the prior art pin 36 in a position in which the pin is substantially aligned with the body hole 56. However, contact between an edge of the moving body rail hole 56 and chamfer 68 on the end of the pin 36 may create a force F that prevents the pin 36 from extending through the hole 56. The tapered surface 60 of the inventive pin 36' better ensures that the pin 36' continues to extend to the fully locked position as the tapered surface 60 slides along the edge of the body hole 56.

FIGS. 6A-6D generally depict several example pin locking systems 22 having different pin combinations and orientations. For example, FIG. 6A illustrates the inventive pins 36' arranged at the forward side of the trailer slider system with the tapered surfaces 60 facing forward. Conventional pins 36 are arranged at the rear side of the trailer slider system. Arranging the tapered surfaces 60 so they face forward better ensures that pins 36' will extend through the body holes 56 if the trailer body shifts forward during a braking operation, as illustrated in FIGS. 4B and 5B. FIG. 6B is similar to FIG. 6A except the inventive pins 36' are used at each of the four corners of the trailer slider system with tapered surfaces 60 facing forward. FIG. 6D is similar to FIG. 6A except the forward and rearward pins are swapped.

FIG. 6C illustrates a pin locking system 22 having the inventive pin 36' on each of the four corners with the tapered surfaces of the forward and rearward pin sets arranged in opposite directions. The forward pin set ensures that the trailer body is locked to the suspension frame if the body moves forward relative to the frame, and the rear pin set ensures that the trailer body locks to the suspension frame in the less likely event of the trailer body moving rearward relative to the suspension frame during vehicle operation with the pins misaligned with the body rail holes 56.

Figure 7A:
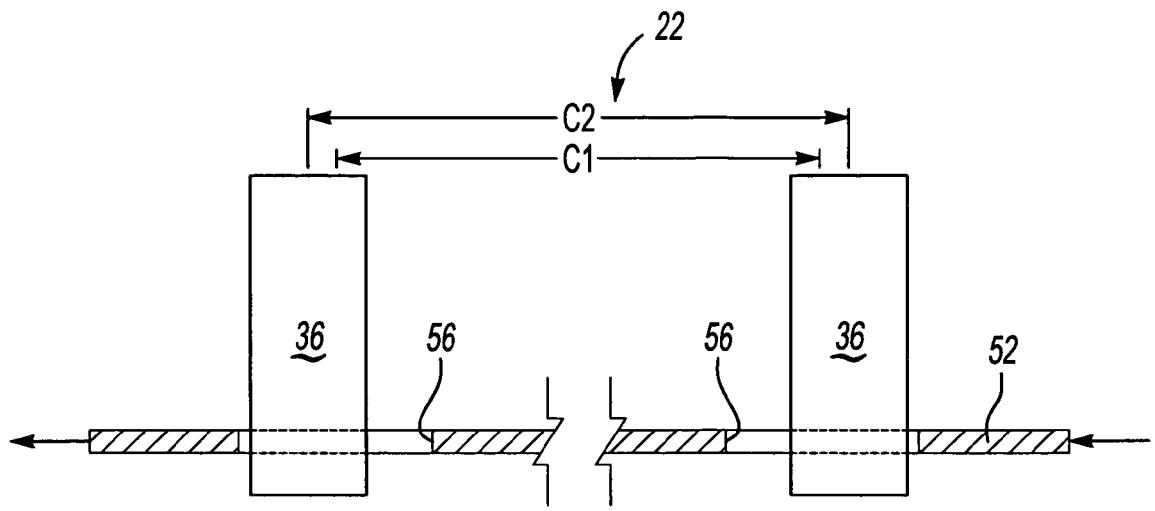
FIG. 7A is a schematic view of an inventive pin arrangement in one position relative to the trailer body holes.
Figure 7B:
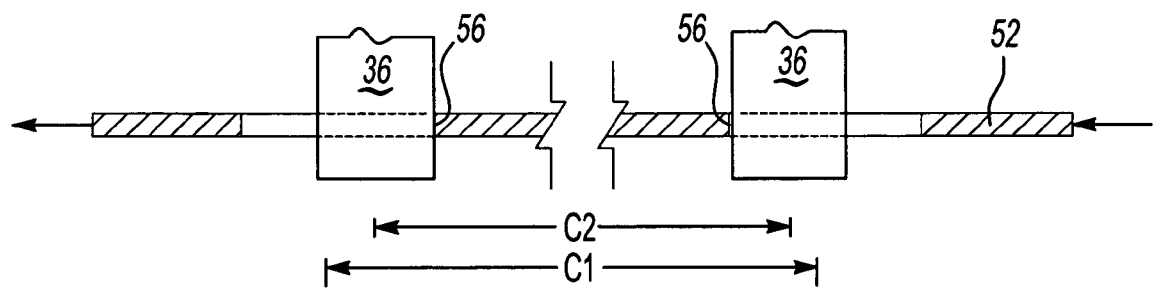
FIG. 7B is a schematic view of an inventive pin arrangement in another position relative to the trailer body holes.

FIGS. 7A and 7B depict one side of a pin locking system 22 that better ensures pin engagement with the body holes 56 when there is a misalignment between the pins 36 and holes 56. Either conventional pins 36 or the inventive pins 36' may be used in this configuration. It is desirable that the body holes 56 be larger than the pin diameter 36, for example, by as much as 25 percent or more. However, it is to be understood that the relative size between the diameter of the pins 36 and holes 56 may vary based upon the particular trailer slider system. The body holes 56 have centerlines that define a first distance C1 between the centerlines. The pins 36 have centerlines that define a second distance C2 between the centerlines. The distance C2 is greater than the distance C1 (see FIG. 7A). Having the centerline distances unequal from one another and the pins 36 smaller than the holes 56 enables the pins 36 to extend through the holes 56 even when the pins 36 are not aligned with the holes 56. In another embodiment (see FIG. 7B), the distance C2 is less than C1.

For the configuration shown in FIG. 7B, as the body rail 52 slides relative to the frame rail in the forward direction, the forward pin will be received in the forward body hole 56. As the body rail 52 continues to move forward, the rearward pin will extend through the rearward body hole 56 so that opposing sides of the pins 36 are in close proximity to opposing sides of the holes 56 on that rail. In this manner, at least one pin on each side will be engaged in a hole to prevent relative movement between the body rail and side rail. As illustrated in FIG. 5A, prior art systems require more precise alignment between the centerline of the pin 36 and body hole 56. The configuration shown in FIG. 7A operates similarly to the embodiment shown in FIG. 7B, except the rear pin engages the hole first.

Figure 8:
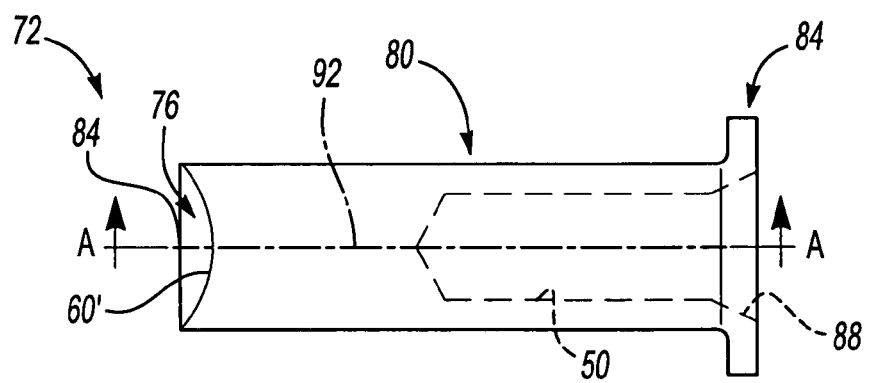
FIG. 8 is a side view of a pin incorporating the subject invention.

If one of the pins 36 does not fully engage the body holes 54, 56, partial engagement of the pin 36 may still prevent relative movement between the body rail and side rail. FIG. 8 illustrates a pin 72 having a tapered portion 76, a body portion 80, and a collar portion 84. A centerline 92 extends through all portions of the pin 72. The tapered portion 76 of the pin 72 includes the tapered surface 60', which allows the tapered portion 76 of the pin 72 to extend through the holes 54 in the side rails 38 and the body rails 52. The tapered portion 76 of the pin 72 can extend through the holes 54 even if the pin 72 is not exactly coaxial with the holes 54, 56. Thus, pin 72 does not require precise alignment between the centerline 92 of the pin 72 and centerline of the body hole 56 to partially engage.

Figure 9:
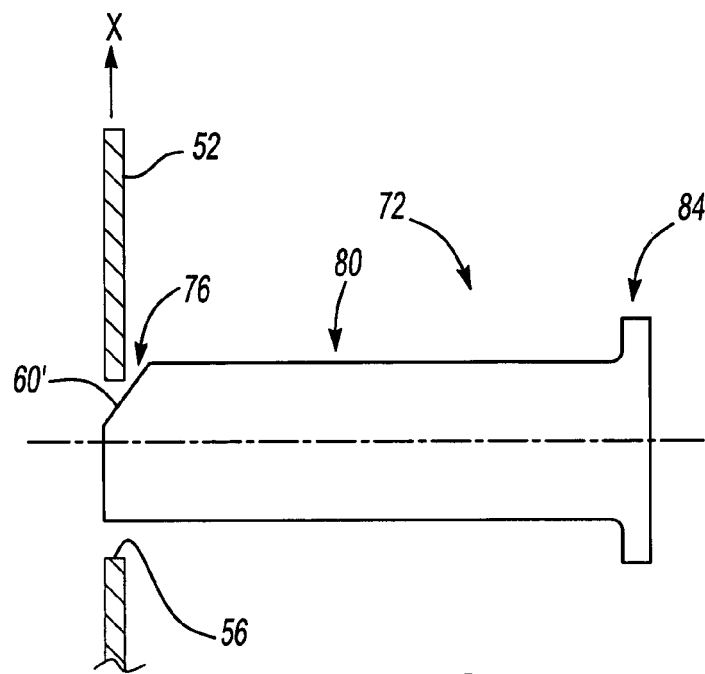
FIG. 9 is a top view of the pin of FIG. 8 received within a body rail.

Referring to FIG. 9, the partially engaged pin 72 prevents movement of the body rail 52 relative to the side rail 38 in an X direction. As long as at least a portion of the pin 72 is received within the body hole 56, movement in an X direction is prevented, even if the centerline of the pin 72 is offset from the centerline of the body hole 56.

The tapered portion 76 of the pin 72 is truncated to create an apex face 86. The area of the apex face 86 is controlled by the amount of the tapered portion truncation and the angle of the tapered surface 60'. As previously described, spring 44 biases the pin 36' toward the locked position. When the pin 72 and the holes 54, 56 are engaged as shown in FIG. 9, tapered surface 60' serves to guide the pin 72 into the body hole 56. When the pin 72 is not engaged in side rail 38, the apex face 86 may slidably contact the side rails 38 thereby providing a load bearing surface for the pin 72 against the side rails 38 when the pin 72 is under load. Increasing the area of the apex face 86 distributes the load and reduces the potential for shearing of the pin 72 if only the end of the pin 72 engages in hole 56. In addition, the apex face 86 provides a wear surface for the pin 72 against the side rails 38.

The body portion 80 and the collar portion 84 define an aperture 50' having an aperture opening 88. The aperture 50' accommodates the end 42 of the linkage 32 if the pin 72 binds or is otherwise prevented from fully seating. The collar portion 84 defines the aperture opening 88, and the aperture opening 88 may be tapered to guide the linkage 32 into the aperture 50.

Figure 10:
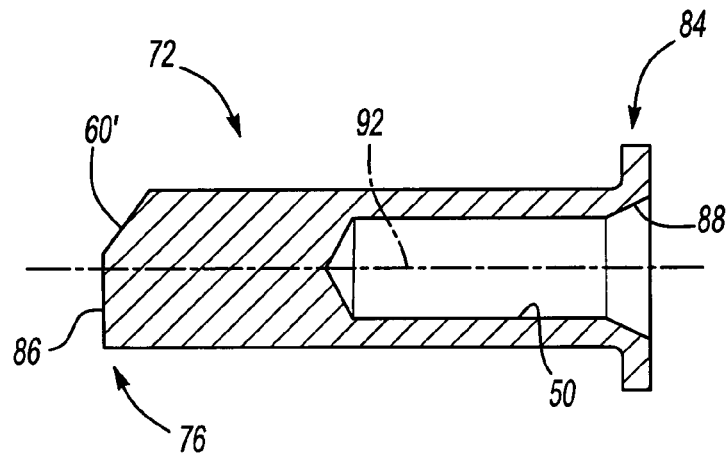
FIG. 10 is a cross-sectional view of the pin along the plane of line A-A in FIG. 8.

FIG. 10 illustrates the relationship between the apex face 86 and the tapered surface 60' in more detail. In this example, the apex face 86 of the pin 72 extends through the centerline 92 of pin 72. As the area of the apex face 86 increases, the amount of truncation also increases.

Figure 11:
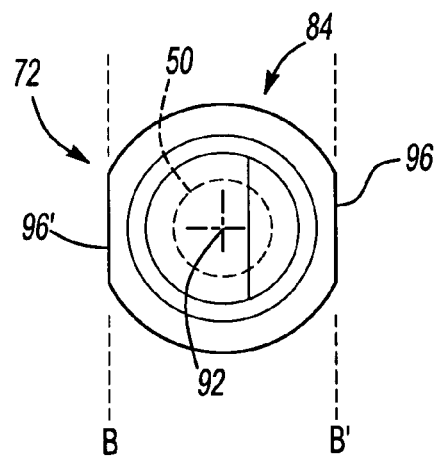
FIG. 11 is a end view of the pin of FIG. 8.

An end view of the pin 72, as shown in FIG. 11, illustrates the relationship of the collar portion 84 to the pin 72. As shown, a perimeter of the collar portion 84 is partially circular. The collar portion 84 is truncated along lines B and B' that are on opposite sides of the centerline 92 from each other. The lines B, B' are spaced apart from and generally perpendicular to the centerline 92. Truncating the collar portion 84 in this manner creates two collar faces 96, 96'.

In one example, the collar portion 84 is sized for accommodation by the cage 34, and the two collar faces 96, 96' correspond to interior edges of the cage 34. Thus, truncating the collar portion 84 prevents rotation of the pin 72 about the centerline 92 as the collar faces 96, 96' contact the interior edges of the cage 34. Although shown as having two collar faces 96, 96,' a single collar face or a collar face having a different profile may also be used to prevent rotation of the pin 72.

In the embodiments discussed above, each pin embodiment is configured to accommodate a partial engagement with a rail body and to accommodate offset alignment between a pin centerline and a hole centerline. The shape of each of the pins contributes to the provision of these benefits. The shape of the pins will be discussed in detail below.

Figure 12:
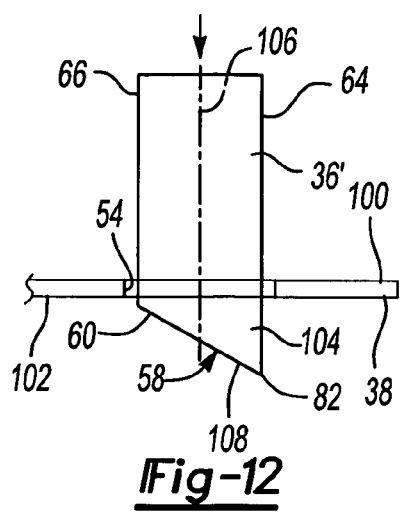
FIG. 12 discloses a top view of one embodiment of a pin received within a trailer body side rail.

A top view of the pin 36' of the embodiment of FIGS. 3B, 4B, and 5B is shown in FIG. 12. The pin 36' is shown as being at least partially received within the hole 54 of the side rail 38 of the trailer suspension frame 12. The side rail 38 has an inboard surface 100 that faces a vehicle center and an outboard surface 102 that faces opposite the inboard surface 100. When the pin 36' is at least partially received within the hole 54, a body portion 104 extends outboard of the outboard surface 102.

The pin 36' defines an axis 106 that extends along the length of the pin 36'. As viewed from above, i.e. looking downward toward ground level, the body portion 104 of the pin 36' that is outboard of the side rail 38 is non-symmetrical about the axis 106. This is due to the tapered surface 60, which extends along an entirety of a distal end face 108 of the pin 36'.

FIGS. 13-19 each show different pin body shapes that are each non-symmetrical about an axis as defined above. Each of these pins will be described in detail below.

Figure 13:
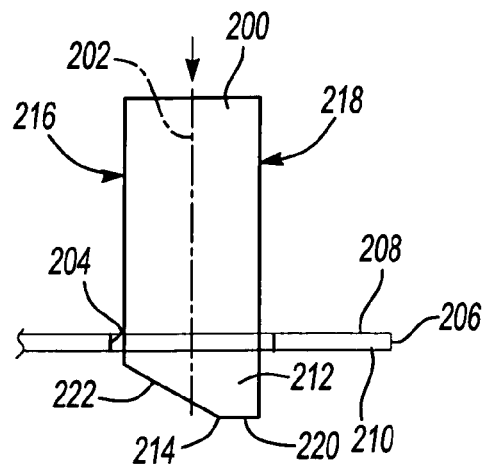
FIG. 13 discloses a top view of another embodiment of a pin received within a trailer body side rail.

FIG. 13 shows a pin 200, similar to that shown in FIGS. 8-11. The pin 200 defines an axis 202 that extends along the length of the pin 200. The pin 200 is received within a hole 204 of the side rail 206 of the trailer suspension frame 12. The side rail 206 includes an inboard surface 208 that faces a vehicle center and an outboard surface 210 that faces opposite the inboard surface 208. When the pin 200 is at least partially received within the hole 204, a body portion 212 extends outboard of the outboard surface 210. This body portion 212 is non-symmetrical about the axis 202, i.e. the body portion 212 is non-symmetrical about the axis 202 for a section extending along a length of the axis 202 when viewed from a position above the pin 200 facing ground level. In other words, when viewed from the top, a length of an upper surface of the body portion 212 that extends along the axis 202 is non-symmetrical about the axis 202. A lower surface of the body portion 212 faces downwardly toward the ground and the upper surface of the body portion 212 faces opposite the lower surface.

The body portion 212 includes a distal end surface 214 that defines a surface segment that extends from one edge 216 of the pin 200 to an opposite edge 218 of the pin 200. One of the edges 216, 218 is a fore edge facing a front of a vehicle, and the other of the edges 216, 218 is an aft edge facing a rear of the vehicle. In the configuration shown in FIG. 13, the surface segment includes a flat portion 220 that is perpendicular to the axis 202, and a ramped portion 222 that transitions into the flat portion 220. The ramped portion 222 is oblique to the axis 202. The ramped portion 222 and the flat portion 220 cooperate to provide the non-symmetrical configuration of the body portion 212.

Figure 14:
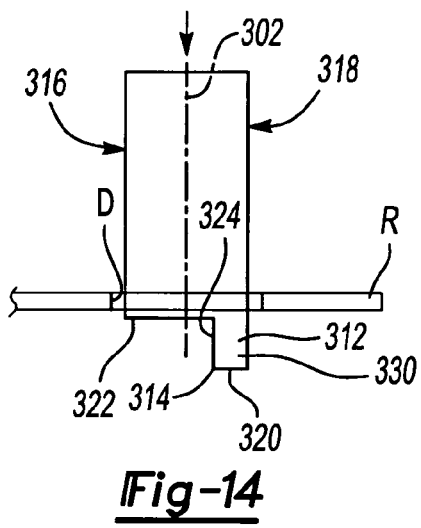
FIG. 14 discloses a top view of another embodiment of a pin received within a trailer body side rail.

The embodiments shown in FIGS. 14-19 are similarly non-symmetrical, but have different profiles for the surface segment of the distal end surface. Each of these embodiments has a pin received within an opening D in a slider side rail R. FIG. 14 has a body portion 312 with a distal end surface 314 that defines a surface segment that extends from one edge 316 to an opposite edge 318 as described above. This surface segment includes a first flat portion 320 that is perpendicular to an axis 302, a second flat portion 322 that is perpendicular to the axis 302, and a vertical portion 324 that transitions between the first and second flat portions 320, 322. The vertical portion 324 is parallel to and spaced apart from the axis 302. The vertical portion 324 and the first and second flat portions 320, 322 cooperate to provide the non-symmetrical configuration of the body portion 312.

Figure 15:
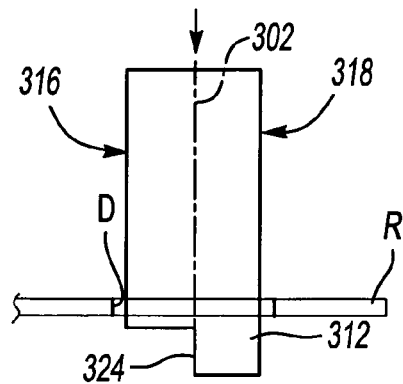
FIG. 15 discloses a top view of another embodiment of a pin received within a trailer body side rail.
Figure 19:
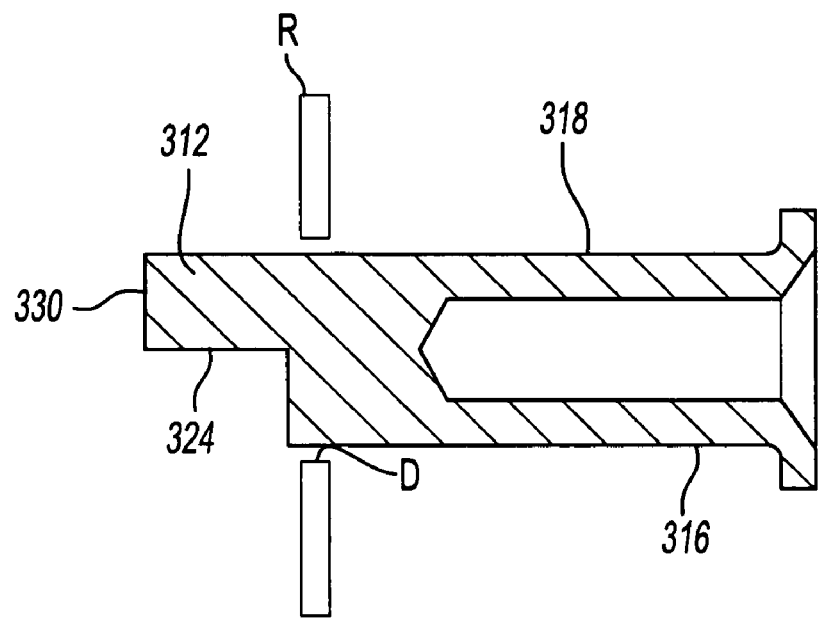
FIG. 19 discloses a top view of another embodiment of a pin received within a trailer body side rail.

The embodiment of FIG. 14 provides the distal end surface 314 with a stepped profile having a reduced area extension portion 330 extending outwardly from one edge 316 of the pin 300. The embodiment of FIG. 15 is similar to that of FIG. 14, however, the vertical portion 324 that defines the extension portion 330 is collinear with the axis 302. FIG. 19 shows a pin that is similar to the pins shown in FIGS. 14 and 15, however the extension portion 330 is positioned at the opposite edge 318.

Figure 16:
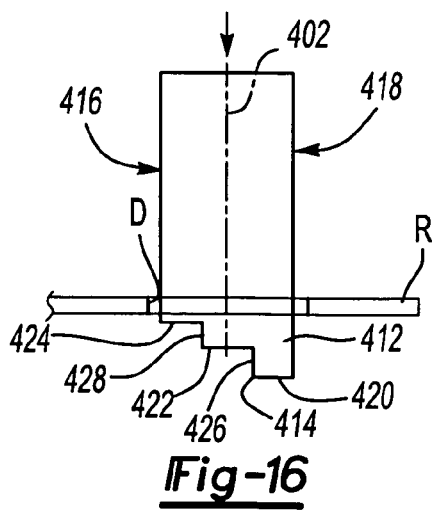
FIG. 16 discloses a top view of another embodiment of a pin received within a trailer body side rail.

FIG. 16 shows a pin having a body portion 412 with a distal end surface 414 that defines a surface segment that extends from one edge 416 to an opposite edge 418 as described above. This surface segment includes a first flat portion 420, a second flat portion 422, and a third flat portion 424 that are each perpendicular to an axis 402. The surface segment also includes a first vertical portion 426 extending between the first 420 and second 422 flat portions, and a second vertical portion 428 extending between the second 422 and third 424 flat portions. The first 426 and second 428 vertical portions are parallel to and spaced apart from the axis 402. The first 426 and second 428 vertical portions and the first 420, second 422, and third 424 flat portions cooperate to provide the non-symmetrical configuration of the body portion 412.

Figure 17:
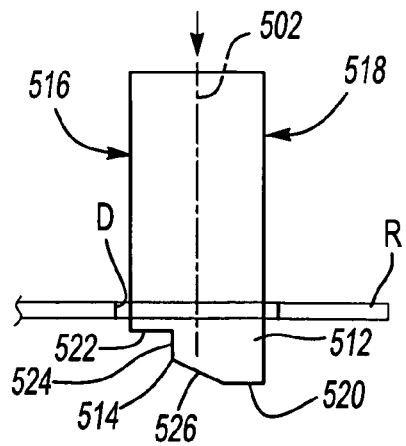
FIG. 17 discloses a top view of another embodiment of a pin received within a trailer body side rail.

FIG. 17 shows a pin with a body portion 512 having a distal end surface 514 that defines a surface segment that extends from one edge 516 to an opposite edge 518 as described above. This surface segment includes first 520 and second 522 flat portions that are perpendicular to an axis 502, and a vertical portion 524 and ramped portion 526 that extend between the first 520 and second 522 flat portions. The vertical portion 524 is parallel to and spaced apart from the axis 302 and the ramped portion 526 is oblique to the axis 502. The ramped portion 526, vertical portion 524, and the first 520 and second 522 flat portions cooperate to provide the non-symmetrical configuration of the body portion 512.

Figure 18:
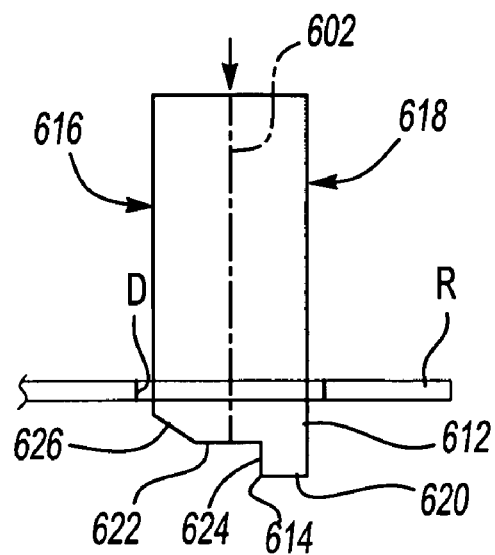
FIG. 18 discloses a top view of another embodiment of a pin received within a trailer body side rail.

FIG. 18 shows a pin having a body portion 612 with a distal end surface 614 that defines a surface segment that extends from one edge 616 to an opposite edge 618 as described above. This surface segment includes first 620 and second 622 flat portions that are perpendicular to an axis 602, a vertical portion 624, and ramped portion 626. The vertical portion 624 extends between the first 620 and second 622 flat portions, and the ramped portion 626 extends from the second flat portion 622 to an edge. The vertical portion 624 is parallel to and spaced apart from the axis 602 and the ramped portion 626 is oblique to the axis 602. The ramped portion 626, vertical portion 624, and the first 620 and second 622 flat portions cooperate to provide the non-symmetrical configuration of the body portion 612.

In each of the embodiments, the surface segment of each distal end face defines a plane that is generally parallel to ground level. Further, in each of the embodiments, a horizontal cross-section of each respective body portion taken in a direction transverse to the axis of the pin is non-symmetrical about the axis. The horizontal cross-section defines a plane that is generally parallel to ground level. The trailer body rail defines a first plane that is generally parallel to the inboard and outboard surfaces of the side rail with the horizontal cross-section defining a second plane that is perpendicular to the first plane.

Finally, it should be understood that each of the various pin embodiments can be used in various pin combinations and orientations, such as those shown in FIGS. 6A-6D, for example.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A trailer slider locking pin assembly comprising:
   a slider side rail having at least one trailer pin hole, said slider side rail having an inboard surface facing a vehicle center and an outboard surface facing opposite of said inboard surface;
   a pin body which defines an axis extending along a length of said pin body, said pin body at least partially received within said at least one trailer pin hole to define a portion of said pin body that extends outboard of said outboard surface of said slider side rail, and wherein an upper surface of said portion is non-symmetrical about said axis; and a collar portion on said pin body opposite said portion of said pin body that extends outboard of said slider side rail wherein said collar portion includes at least one truncated outer edge to create a generally planar surface that cooperates with cages mounted to a suspension frame to prevent rotation of said pin body.

2. The trailer slider locking pin assembly according to claim 1 wherein said collar portion is defined by a generally constant outer diameter along a length of said collar portion.

3. The trailer slider locking pin assembly according to claim 2 wherein said pin body includes a first pin end comprising said portion that extends outboard of said outboard surface of said slider side rail and includes a second pin end that is opposite said first pin end, said collar portion being formed adjacent said second pin end.

4. A trailer slider locking pin assembly comprising:

a slider side rail having at least one trailer pin hole wherein said slider side rail has an inboard surface facing a vehicle center and an outboard surface facing opposite of said inboard surface;

a trailer pin body which defines an axis extending along a length of said trailer pin body, said trailer pin body being movable between an extended position where one end of said trailer pin body is at least partially received within said at least one trailer pin hole and a retracted position wherein said one end of said trailer pin body is moved out of said trailer pin hole, and wherein said trailer pin body is at least partially received within said at least one trailer pin hole to define a portion of said trailer pin body that extends outboard of said outboard surface of said slider side rail;

a cage that houses said trailer pin body; and a resilient member that reacts directly between a first reaction surface on said trailer pin body and a second reaction surface on said cage to bias said trailer pin body for movement in a desired direction relative to said cage, and wherein said first reaction surface comprises an enlarged pin portion defined by a generally constant cross-section, and wherein said first reaction surface is located on said trailer pin body at a location that is inboard of said portion of said trailer pin body that extends outboard of said slider side rail, and wherein said first reaction surface includes at least one truncated outer edge to create a generally planar surface that cooperates with said cage to prevent rotation of said pin body.

5. The trailer slider locking pin assembly according to claim 4 wherein said enlarged pin portion comprises a collar.

6. The trailer slider locking pin assembly according to claim 4 wherein said enlarged pin portion comprises a flange.

7. The trailer slider locking pin assembly according to claim 4 wherein said second reaction surface comprises an end wall of said cage.

8. The trailer slider locking pin assembly according to claim 4 wherein said trailer pin body comprises a first portion defined by a first diameter and a second portion defined by a second diameter greater than said first diameter, and wherein said first reaction surface is part of said second portion.

9. The trailer slider locking pin assembly according to claim 8 wherein said second portion comprises a collar.

10. The trailer slider locking pin assembly according to claim 8 wherein said trailer pin body includes a distal tip portion and wherein said first diameter is generally constant along a length of said first portion, said second diameter is generally constant along a length of said second portion, and said distal tip portion is defined by a non-constant diameter.

11. The trailer slider locking pin assembly according to claim 4 wherein an upper surface of said portion of said trailer pin body is non-symmetrical about said axis.

12. The trailer slider locking pin assembly according to claim 4 wherein said enlarged pin portion comprises a first pin portion defined by first outer diameter and wherein said trailer pin body includes a second pin portion defined by a second outer diameter less than said first outer diameter, and wherein said first outer diameter is generally constant along a length of said first pin portion.

13. The trailer slider locking pin assembly according to claim 12 wherein said trailer pin body includes a distal tip that is defined by a variable cross-section, said distal tip extending outboard of said first and said second pin portions.

14. The trailer slider locking pin assembly according to claim 13 wherein an upper portion of said distal tip is non-symmetrical about said axle and wherein said distal tip decreases in cross-sectional area along an outboard direction.

15. The trailer slider locking pin assembly according to claim 13 wherein said first pin portion comprises an inboard pin end and said second pin portion comprises an outboard pin end that transitions into said distal tip.

16. A trailer slider locking pin assembly comprising:

a slider side rail having at least one trailer pin hole wherein said slider side rail has an inboard surface facing a vehicle center and an outboard surface facing opposite of said inboard surface;

a trailer pin body which defines an axis extending along a length of said trailer pin body, said trailer pin body being movable between an extended position where one end of said trailer pin body is at least partially received within said at least one trailer pin hole and a retracted position wherein said one end of said trailer pin body is moved out of said trailer pin hole, and wherein said trailer pin body is at least partially received within said at least one trailer pin hole to define a portion of said trailer pin body that extends outboard of said outboard surface of said slider side rail, and wherein said portion of said trailer pin body that extends outboard of said outboard surface of said slider side rail has a distal end surface, said distal end surface comprising a single unitary planar surface that is obliquely orientated relative to said axis;

a cage that houses said trailer pin body; and a resilient member that reacts directly between a first reaction surface on said trailer pin body and a second reaction surface on said cage to bias said trailer pin body for movement in a desired direction relative to said cage, and wherein said first reaction surface comprises an enlarged pin portion defined by a generally constant cross-section, and wherein said first reaction surface is located on said trailer pin body at a location that is inboard of said portion of said trailer pin body that extends outboard of said slider side rail.

17. A trailer slider locking pin assembly comprising:

a slider side rail having at least one trailer pin hole wherein said slider side rail has an inboard surface facing a vehicle center and an outboard surface facing opposite of said inboard surface;

a trailer pin body which defines an axis extending along a length of said trailer pin body, said trailer pin body being movable between an extended position where one end of said trailer pin body is at least .partially received within said at least one trailer in hole and a retracted position wherein said one end of said trailer pin body is moved out of said trailer pin hole, and wherein said trailer pin body is at least partially received within said at least one trailer pin hole to define a portion of said trailer pin body that extends outboard of said outboard surface of said slider side rail, and wherein said portion of said trailer pin body that extends outboard of said outboard surface of said slider side rail has a distal end surface, said distal end surface comprising only two discrete surfaces including a first planar surface that is obliquely orientated relative to said axis and a second planar surface that is perpendicular to said axis:

a cage that houses said trailer pin body: and a resilient member that reacts directly between a first reaction surface on said trailer pin body and a second reaction surface on said cage to bias said trailer pin body for movement in a desired direction relative to said cage, and wherein said first reaction surface comprises an enlarged pin portion defined by a generally constant cross-section. and wherein said first reaction surface is located on said trailer pin body at a location that is inboard of said portion of said trailer pin body that extends outboard of said slider side rail.

18. A trailer slider locking pin assembly comprising:

a slider side rail having at least one trailer pin hole wherein said slider side rail has an inboard surface facing a vehicle center and an outboard surface facing opposite of said inboard surface;

a trailer pin body which defines an axis extending along a length of said trailer pin body, said trailer pin body being movable between an extended position where one end of said trailer pin body is at least partially received within said at least one trailer pin hole and a retracted position wherein said one end of said trailer pin body is moved out of said trailer pin hole, and wherein said trailer pin body is at least partially received within said at least one trailer pin hole to define a portion of said trailer pin body that extends outboard of said outboard surface of said slider side rail, and wherein said portion of said trailer pin body that extends outboard of said outboard surface of said slider side rail has a distal end surface, said distal end surface comprising at least one stepped portion having a surface segment that is perpendicular to said axis;

a cage that houses said trailer pin body; and a resilient member that reacts directly between a first reaction surface on said trailer pin body and a second reaction surface on said cage to bias said trailer pin body for movement in a desired direction relative to said cage, and wherein said first reaction surface comprises an enlarged pin portion defined by a generally constant cross-section, and wherein said first reaction surface is located on said trailer pin body at a location that is inboard of said portion of said trailer pin body that extends outboard of said slider side rail.

19. The trailer slider locking pin assembly according to claim 18 wherein said distal end surface includes at least one ramped portion that is obliquely orientated relative to said axis.

* * * * *